June 24, 1930.  W. C. STEVENS  1,768,341
TIRE BUILDING MACHINE
Filed Nov. 6, 1926   2 Sheets-Sheet 2
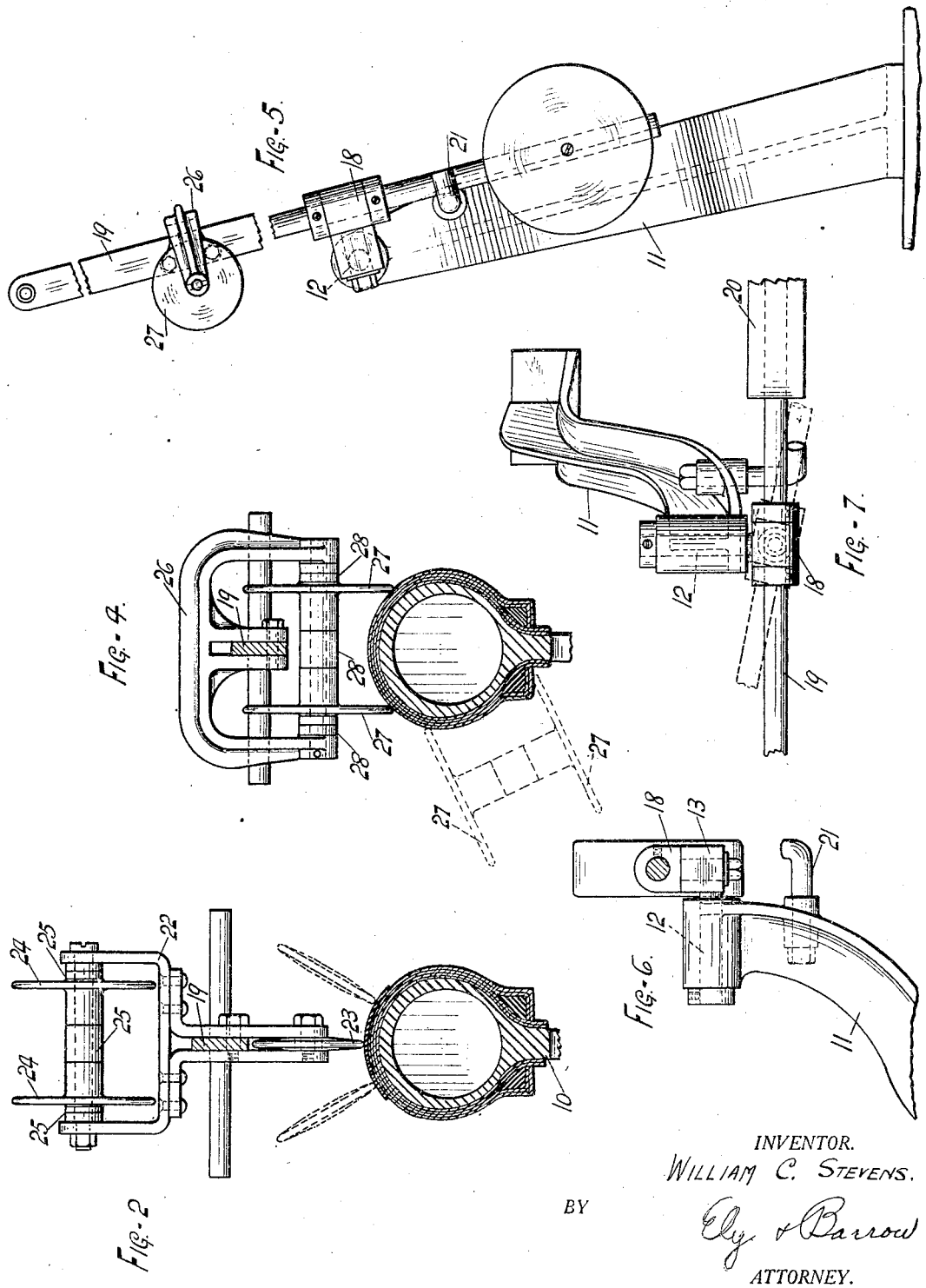
INVENTOR.
WILLIAM C. STEVENS.
BY
Ely & Barrow
ATTORNEY.

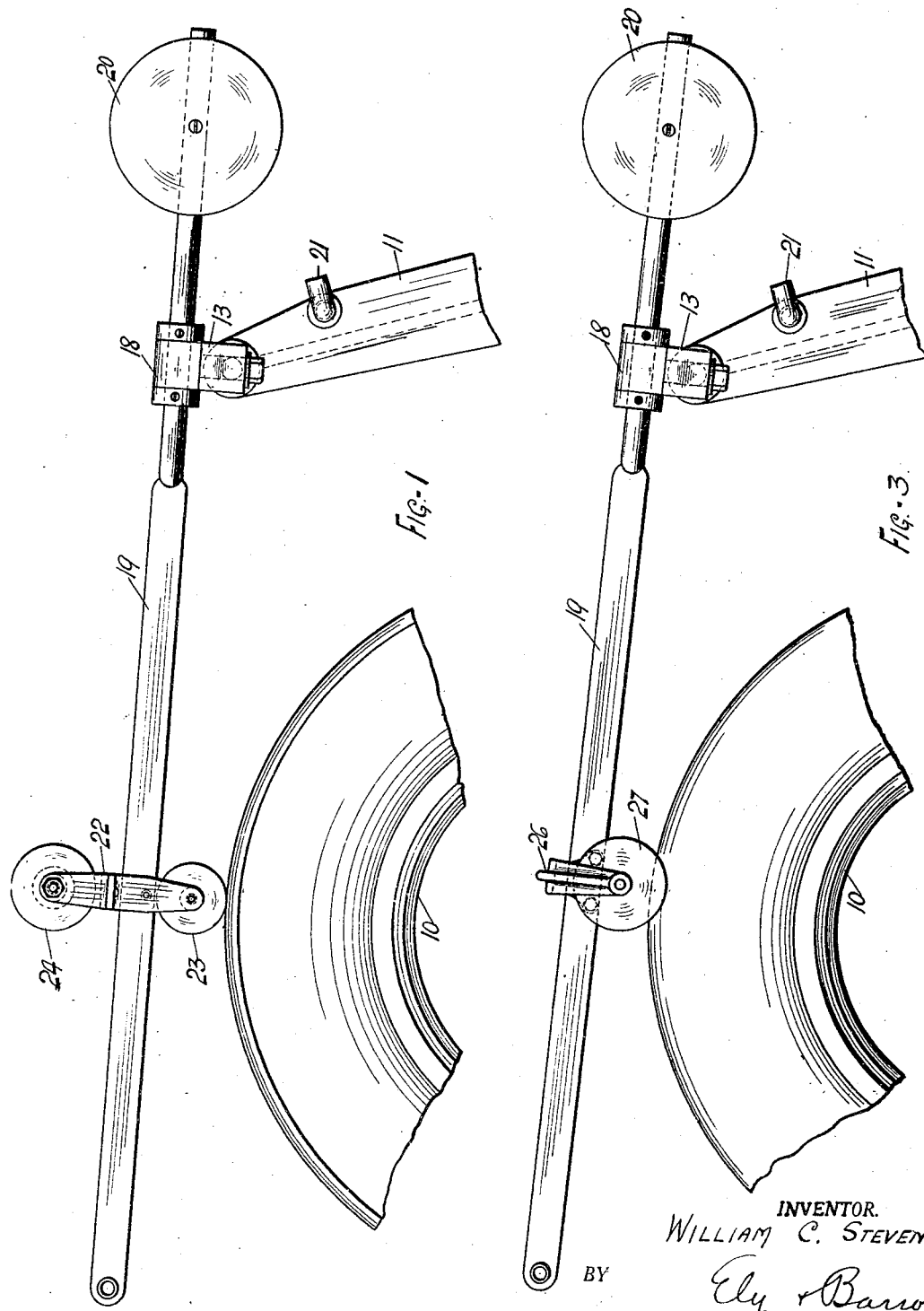

Patented June 24, 1930

1,768,341

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

TIRE-BUILDING MACHINE

Application filed November 6, 1926. Serial No. 146,699.

This invention relates to tire building machines and particularly to stitchers therefor.

The general purpose of the invention is to provide an improved stitcher capable of use both for stitching fabric or cord plies of tire building material about a building core and stitching a thread thereon.

Particularly, the invention contemplates a manually operable stitcher, including a pivotally mounted arm swiveled onto a support, and a stitcher, including spaced rotary discs carried by the arm and operable onto a tire core in the manner of a tread roller and also about the tire building core, one disc to engage the core and serve as a tool rest and guiding member for the other, and vice versa, in operating upon the opposite sides of the core.

The foregoing and other objects are obtained by the devices illustrated in the accompanying drawings and described below. It is to be understood that the invention is not limited to the specific forms thereof disclosed herein.

Of the accompanying drawings:

Figure 1 is a side elevation of one form of stitcher device embodying the invention shown in operation against a core.

Figure 2 is an end elevation, partly in section thereof.

Figure 3 is a similar side elevation of another form of stitcher embodying the invention.

Figure 4 is an end elevation partly in section thereof.

Figure 5 is a side elevation, partly broken away, showing the same in an inoperative position.

Figure 6 is an end elevation, partly in section of the stitcher mounting; and

Figure 7 is a plan thereof.

Referring to the drawings, 10 indicates a rotatable core on which a tire is built and 11 a suitable stand adjacent the core on which either form of stitcher shown may be mounted for operation on core 10. The stand 11 has pivoted thereon at 12 a stitcher mounting member 13 on which is swiveled a bracket 18, in which is journaled a hand lever 19 counterweighted as at 20 to swing the lever into inoperative position (Figure 5), a stop 21 being arranged on stand 11 to support the lever 19 in operative position.

In Figures 1 and 2, one form of stitcher is mounted on lever 19 while in Figures 3 to 5, another form is shown. The first form comprises a bracket 22 secured in lever 19 and having a single stitcher disc 23 journaled therein on one side of lever 19, and a second stitcher comprising spaced stitcher discs 24, 24 journaled upon the bracket on the other side thereof, the spacing of the discs being variable by use of different length spacers such as indicated at 25.

In Figures 3 to 5, a bracket 26 is shown on which only the spaced disc stitcher is journaled, this stitcher comprising discs 27, 27 and spacers indicated at 28. For certain sizes of tires the single disc stitcher may be dispensed with.

In operation of the first form of the invention, the fabric or cords are applied to the core and the core is rotated in the customary manner. The lever 19 is rotated upon its mounting to bring the single stitcher disc 23 therebeneath, and the same is used in stitching the plies or tread on the outer periphery of the core (Figure 2). The lever 19 is then rotated to bring the double disc stitcher therebeneath and the latter, as well as the double disc stitcher shown in Figures 3 and 5, is operated against the outer periphery of the tire to stitch the edges of the plies on the edges of the tread in place in the manner of the concave tread roller heretofore employed. In addition, this stitcher is used for stitching the plies about the sides of the core and the beads (see dotted line position thereof in Figure 4), the mounting of lever 19 permitting movement of the stitcher about the core, one stitcher disc acting against the core as a tool rest to guide the other stitcher disc into proper angular relation to the core so as effectively to stitch the plies against the inner peripheral edges of the core or about the beads. When using the form shown in Figures 3 to 5, it is possible to obtain the single disc stitcher action on the periphery of the core by merely shifting lever 19 so that only one disc 26 rides thereon.

Modifications of the invention may be resorted to without departing from the spirit thereof, or the scope of the appended claims.

What is claimed is:

1. A tire building machine comprising, in combination, a rotatable core, a standard, and a manually operable lever pivotally mounted on the standard and carrying a stitcher for operation on the core, the pivotal mounting of the lever permitting movement of the stitcher transversely from bead to bead of a tire about the core, said stitcher comprising spaced rotatable discs each adapted to act against the core as a tool rest for the other respectively, on opposite sides of the core.

2. A tire building machine comprising, in combination a rotatable core, a standard, and a lever pivotally mounted on the standard and carrying a stitcher for operation on the core, the pivotal mounting of the lever permitting movement of the stitcher transversely to operate the stitcher entirely about the core from bead to bead of a tire.

3. A tire building machine comprising, in combination, a rotatable core, a standard, and a lever pivotally mounted on the standard and carrying a stitcher for operation on the core, the pivotal mounting of the lever permitting movement of the stitcher transversely from bead to bead of a tire about the core, said stitcher comprising spaced stitcher elements, each adapted to act against the core as a tool rest for the other.

WILLIAM C. STEVENS.